Patented Apr. 12, 1927.

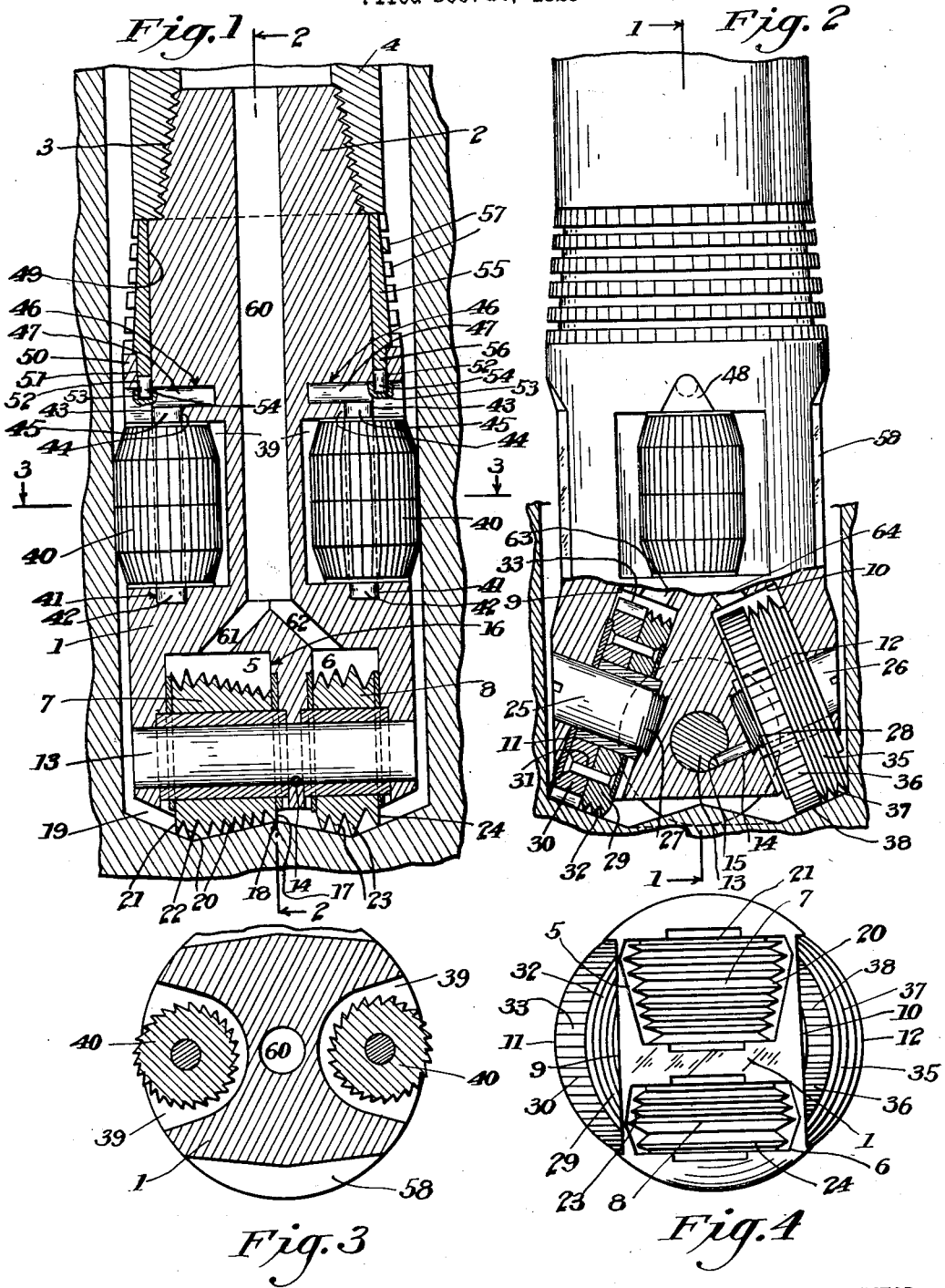

1,624,312

UNITED STATES PATENT OFFICE.

ANTHONY E. CARLSON, OF LOS ANGELES, CALIFORNIA.

ROCK DRILL.

Application filed December 14, 1925. Serial No. 75,377.

My invention is a drill bit particularly useful for drilling deep oil wells, and the general object thereof is to provide a drill bit of the character stated adaptable to standard rotary drill equipment, which will be simple in construction, highly efficient in operation, easy to assemble or take apart, and which will effectively bore its way out of a well with a "cave-in".

Other objects and advantages will appear hereinafter.

The invention is illustrated in the annexed drawing which forms a part of this specification and in which—

Figure 1 is a vertical longitudinal section of the drill bit taken on line 1—1 of Figure 2.

Figure 2 is a view of the bit partly in elevation and partly in vertical longitudinal section taken on the line 2—2 of Figure 1.

Figure 3 is a horizontal section of the bit taken on line 3—3 of Figure 1.

Figure 4 is a bottom plan view of the bit.

Corresponding reference characters designate the same parts in all the views.

In the drawing 1 designates a mounting formed with a threaded pin 2 on its upper end for screw seating in a threaded box 3 on the lower end of the drill stem 4 of a standard rotary well drill equipment. The mounting 1 is provided with recesses 5 and 6 in its lower end to receive rotary cutters 7 and 8 respectively and with recesses 9 and 10 to receive rotary cutters 11 and 12 respectively. The cutters 7 and 8 are journaled to rotate in a vertical plane on a shaft 13 fitted in the lower end of the mounting 1 and extending transversely thereof through the recesses 5 and 6, said shaft being held against rotation by a pin 14 driven into the lower end of the mounting between said recesses and into a notch 15 in one side of the shaft.

The inner side 16 of the recess 5 and the inner end 17 of the cutter 7 coincide with the center or axis of the bit so that said cutter will cut outward from the center 18 of the bore 19 cut by the bit. The cutter 7 is formed with a plurality of spaced annular cutting edges 20, the innermost of which coincides with the inner end of the cutter, and an annular cutting edge 21, the cutter being of double conical formation, diverging outwardly from its inner end 17 to its outermost annular cutting edge 20, and converging outwardly from said cutting edge to its outermost cutting edge 21, said cutting edges 20 and 21 being spaced a short distance apart. The cutting edges 20 cut the bottom of the bore downwardly from its center 18 to a point 22, from which point the bottom of the bore is cut upwardly at an angle a short distance by the cutting edge 21.

The cutter 8 is of double conical formation and is formed with a plurality of spaced annular cutting edges 23 and an annular cutting edge 24, the cutter diverging outwardly to its cutting edge 23 of larger diameter and converging outwardly from said edge to its cutting edge 24 which is spaced outwardly from said edge 23. The edge 23 of smallest diameter is spaced outwardly a short distance from the center 18 of the bore while the edge 23 of larger diameter coincides with deepest cutting point 22 of the bit, the teeth 23 cutting the bottom of the bore on the downward angular surface from the center 18 to the point 22. The cutting edge 24 cuts the bottom of the bore upwardly from the point 22. The surface of the bottom of the bore from the center 18 to the edge 23 of smallest diameter of cutter 8, being near the center of the bore, may be effectively cut by a single cutter 7, but beyond said surface where greater work is required the cutters 8, 11 and 12 are employed.

The recesses 9 and 10 extend downwardly and outwardly at an angle and the cutters 11 and 12 are journaled on shafts 25 and 26 respectively, which shafts are fitted in the lower portion of the mounting 1, extending downwardly at an angle across the recesses 9 and 10 respectively on an axis intersecting the center of the shaft 13, the inner ends of said shafts 25 and 26 being in threaded engagement with the mounting as indicated at 27 and 28 respectively. The cutter 11 comprises a rough cutter member 29 and a finishing cutter member 30, which members are secured together by rivets 31, the member 29 comprising a plurality of spaced annular cutting edges 32 and the member 30 comprising a plurality of spaced transverse straight teeth 33. The cutter 11 cuts the bottom of the bore 19 on an upward angle from the position of the cutting edges 21 and 24 of the cutters 7 and 8 respectively to the circumference of the bore, said upward angle being a continuation of the angular surface cut from the point 27 to the position of said cutting edges 21 and 24. The rough cutting member 29 is secured against the inner side of the finishing cutter member 30, so that the rough cutter member will cut the inner half of the bottom surface between the position of the cutting edges 21 and 24 and the circumference of the bore, while the finishing cutter member will cut the outer half of said surface. The cutter 12 comprises an outer rough cutter member 35 and an inner finishing cutter member 36, the rough cutter member having a plurality of spaced annular cutting edges 37 and the finishing cutter member having a plurality of spaced transverse cutting teeth 38. The cutter 12 cuts the same surface as the cutter 11, but the finishing cutter member 38 covers and finishes the rough surface cut by the rough cutter member 29, while the rough cutter member 35 rough cuts the surface finished by the finishing cutter member 30.

The mounting 1 is formed with a pair of recesses 39 in opposite sides thereof above the recesses 5 and 6 to receive the reamers 40. The mounting is formed with bearings 41 in the lower end of the recesses 39 to receive the lower reamer journals 42 whereby the lower ends of the reamers are journaled. The mounting 1 is notched at 43 inwardly at the upper end of the recesses 39 and is formed with open bearings 44 opening from said notches 43 to receive the upper journals 45 of the reamers 40. The mounting 1 is formed with keyways 46 extending inwardly from opposite sides thereof above the notches 43 and bearings 44 and in communication with said notches, into which keyways are fitted keys 47 formed with heads 48 which fit in the notches 43 against the reamer journals 45 and detachably hold said journals in the upper bearings 44.

The mounting 1 is formed with a cylindrical face 49 above the keyway 46 and with an upturned annular flange 50 external of the lower end of said face providing an annular groove 51 between said face and flange, which groove extends downwardly from the upper edge of said flange. Dowel openings 52 are provided in the mounting 1 extending from the bottom of the groove 51 into the keyways 46 and dowel notches 53 are provided in the upper edges of the keys 48 which notches register respectively with said openings so that dowels 54 may be inserted through said openings into said notches to hold the keys 47 in the keyways 46. An annular conical cutter 55 converging upwardly is fitted tightly on the cylindrical face 49 with the lower portion 56 of the cutter resting in the groove 51 and with the box 3 of the drill tube 4 engaging the upper edge of the cutter. The cutter 55 is provided on its periphery with cutting teeth 57. Depressions 58 are provided in the periphery of the mounting 1 between the reamer recesses 39 to provide for ample mucking space between the mounting and the wall of the bore. The mounting 1 is provided with a vertical axial flushing duct 60 extending from the upper end of the mounting in communication with the lower end of the drill tube 4, and provided with outlets 61, 62, 63 and 64 leading into the cutter recesses 5, 6, 9 and 10 respectively for flushing the cutters 7, 8, 11 and 12.

In case of a cave-in the bit may drill its way out by means of the cutter 55.

I claim—

1. A drill bit including a mounting, a pair of double conical cutters journaled in the lower end of said mounting, one of said cutters being positioned to cut the bottom of the bore downwardly and outwardly from the center thereof at an angle and upwardly further outwardly a short distance at an angle, the other cutter being positioned to cut the bottom of the bore for a short distance on a downward angle from a point spaced outwardly from the center of the bore and to cut the bottom of the bore for a short distance further outwardly on an upward angle, and other cutters journaled in the lower end of the mounting for cutting the bottom of the bore upwardly and further outwardly on an upwardly extending angle.

2. A drill bit including a mounting, a pair of double conical cutters journaled in the lower end of said mounting, said cutters being constructed with a plurality of spaced annular cutting edges, one of said cutters being positioned to cut the bottom of the bore downwardly and outwardly from the center thereof at an angle and upwardly further outwardly a short distance at an angle, the other cutter being positioned to cut the bottom of the bore for a short distance on a downward angle from a point spaced outwardly from the center of the bore and to cut the bottom of the bore for a short distance further outwardly on an upward angle, and other cutters journaled in the lower end of the mounting for cutting the bottom of the bore upwardly and further outwardly on an upwardly extending angle.

3. A drill bit including a mounting, bit cutters mounted in said mounting, reamers journaled in said mounting, conventional bearings in said mounting for the lower journals of said reamers, open-sided bearings for the upper journals of said reamers, keys fitted in the mounting for engaging said upper journals and holding them in said open-sided bearings, the mounting being formed with an annular groove above said keys, the mounting being provided with openings extending through the bottom of said groove, the keys having notches therein, dowels extending through said openings into said notches for holding said keys in position, and a cutter secured on the mounting with its lower end in said groove, which cutter is constructed and arranged for boring the bit out of a cave-in.

4. A drill bit including a mounting, bit cutters mounted in the lower end of the mounting, the mounting being provided with an annular groove, a cutter fitted on the mounting with its lower end resting in said groove, said cutter being constructed and arranged for boring the bit out of a cave-in, and a "pin" on the upper end of the mounting for engaging the "box" on the lower end of a drill tubing with the box engaging the upper end of said cutter.

In testimony whereof I hereunto affix my signature.

ANTHONY E. CARLSON.